United States Patent [19]

Fau

[11] Patent Number: 4,624,900
[45] Date of Patent: Nov. 25, 1986

[54] AQUEOUS POLYSILOXANE EMULSIONS FOR ANTI-ADHESIVE/WATER-REPELLENT COATINGS

[75] Inventor: Alain Fau, Tassin-La Demi-Lune, France

[73] Assignee: Rhone-Poulenc Specialites Chimiques, Courbevoie, France

[21] Appl. No.: 743,811

[22] Filed: Jun. 12, 1985

[30] Foreign Application Priority Data

Jun. 12, 1984 [FR] France ................... 84 09107

[51] Int. Cl.$^4$ ............................................. B32B 9/04
[52] U.S. Cl. ...................................... 428/447; 427/387;
427/394; 428/452; 524/27; 524/31; 524/47;
524/588; 524/702; 524/732; 524/733; 524/734;
524/860; 524/861; 524/862; 528/18; 528/31;
528/32; 528/33
[58] Field of Search ..................... 524/27, 31, 47, 588,
524/702, 732, 733, 734, 860, 861, 862; 427/387,
394; 428/447, 452; 528/18, 31, 33, 32

[56] References Cited

U.S. PATENT DOCUMENTS

| | | | |
|---|---|---|---|
| 4,127,460 | 11/1978 | Gaske et al. | 204/159.18 |
| 4,288,356 | 9/1981 | Huebner et al. | 525/102 |
| 4,423,095 | 12/1983 | Blizzard | 524/588 |
| 4,518,727 | 5/1985 | Traver | 524/860 |

FOREIGN PATENT DOCUMENTS

| | | |
|---|---|---|
| 2466493 | 9/1980 | France . |
| 2482614 | 5/1981 | France . |
| 908988 | 10/1962 | United Kingdom . |
| 2016494 | 9/1979 | United Kingdom . |

*Primary Examiner*—Melvyn I. Marquis

*Attorney, Agent, or Firm*—Burns, Doane, Swecker & Mathis

[57] ABSTRACT

Storage-stable, aqueous polysiloxane emulsions well adopted as coating compositions to impart anti-adhesiveness/water-repellency to a wide variety of substrates, e.g., paper, are comprised of an anti-adhesive/water-repellency effective amount of (A) diorganopolysiloxane oil having the formula:

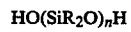

$$HO(SiR_2O)_nH$$

wherein the symbols R, which may be identical or different, are each an alkyl radical containing from 1 to 3 carbon atoms, the 3,3,3-tri-fluoropropyl radical, or the vinyl radical, at least 50% of the radicals R being methyl radicals and at most 5% vinyl radicals, and the symbol n is any number, the value of which is such that the viscosity of the oil ranges from 500 to 50,000 mPa.s at 25° C.; (B) an organopolysiloxane resin comprising recurring units selected from among those of the formulae R'SiO$_{1.5}$, R'$_2$SiO and R'$_3$SiO$_{0.5}$, in which the symbols R', which may be identical or different, are each an alkyl radical containing from 1 to 3 carbon atoms, or the vinyl radical, at least 70% of the radicals R' being methyl radicals, and said units being distributed such as to provide a R'/Si ratio ranging from 1.05 to 1.85; (C) a liquid organohydropolysiloxane containing at least 3 hydrogen atoms per molecule directly bonded to silicon atoms, said organic groups bonded to the silicon atoms being R' radicals as defined above, at least 80% of said radicals being methyl radicals; (D) a thickening amount of a thickening agent; (E) a water-repellency effective amount of a vinyl acetate homo- or copolymer; (F) a polyvinyl alcohol; (G) an emulsifying amount of a nonionic emulsifier; and (H) water.

13 Claims, No Drawings

AQUEOUS POLYSILOXANE EMULSIONS FOR ANTI-ADHESIVE/WATER-REPELLENT COATINGS

BACKGROUND OF THE INVENTION

1. Field of the Invention

The present invention relates to novel compositions of matter, and especially aqueous emulsions thereof, which comprise organosilicic polymers together with organic polymers. The subject compositions can be employed for the production of anti-adhesive (non-stick) and/or water-repellent coatings on various substrates (supports), in particular on cellulosic materials.

2. Description of the Prior Art

Compositions which are in the form of aqueous emulsions (hereinafter designated "aqueous emulsion compositions") containing organosilicic polymers, either alone or admixed with various organic compounds or polymers, have long been known to this art. Compare, in particular, published Japanese Application No. 72/23,325, U.S. Pat. Nos. 4,127,460 and 4,288,356 and French Pat. Nos. 2,401,195 and 2,419,961.

Japanese Application No. 72/23,325 describes a composition containing a diorganopolysiloxane oil blocked at each end of its polymer chain with a hydroxy radical bonded to a silicon atom, a methylhydropolysiloxane, a carboxymethylcellulose, a monoether of a polyalkylene glycol, a surface-active agent, a tin salt such as dibutyltin dilaurate and water.

This composition is easily spread onto papers coated with polyolefins and provides a friction-resistant coating.

U.S. Pat. No. 4,127,460 describes a composition containing an alkylhydropolysiloxane, a liquid polyacrylate-containing tertiary amine, at least partially neutralized with an acid, a photosensitizer, an emulsifying agent and water. This composition hardens on exposure to ultraviolet radiations; the resultant coating adheres efficiently to the surface of supercalendered papers.

French Pat. No. 2,401,195 relates to a composition incorporating a diorganopolysiloxane having a viscosity of 50,000 to 500,000 mPa.s at 25° C., blocked at each end of its polymer chain with a hydroxy radical bonded to a silicon atom, containing from 0.1 to 4% by weight of vinyl radicals bonded to the silicon atoms in its polymer chain, or a diorganopolysiloxane of the same type but blocked at each end of its polymer chain with a diorganovinylsiloxy unit, an organohydropolysiloxane, a colloidal silica, an emulsifying agent, a catalytic amount of a platinum derivative and water.

Once it is deposited onto a paper substrate, this composition is converted by heating into a coating, the anti-adhesive nature of which is improved in respect of contact adhesives.

Published French Application No. 2,419,961 relates to a composition comprising a liquid diorganopolysiloxane, having a viscosity of 1,500 to 24,000 mPa.s at 25° C., blocked at each end of its polymer chain with a hydroxy radical bonded to a silicon atom, preferably containing from 0.1 to 2% by weight of vinyl radicals bonded to silicon atoms in its polymer chain, an organohydropolysiloxane, one or more emulsifying agents, a catalyst selected from among platinum derivatives and tin salts of carboxylic acids, and water.

In the case where tin salts are employed as catalysts for hardening, it is necessary to use a 3-component system respectively containing the hydroxylated diorganopolysiloxane emulsion, the organohydropolysiloxane emulsion and the tin salt emulsion. These three emulsions are mixed only at the point in time of use. The '961 publication also describes that the hydroxydiorganosiloxane emulsion employs a polyvinyl alcohol as an emulsifying agent and the organohydropolysiloxane emulsion employs a polyoxyethylenated alkylphenol.

This composition can harden either when cold or hot.

U.S. Pat. No. 4,288,356 relates to an aqueous emulsion which provides an elastomeric coating after deposition onto a substrate such as paper. This emulson is formed by mixing:

(i) an aqueous emulsion of a diorganopolysiloxane blocked at each end of its polymer chain with a hydroxy radical bonded to a silicon atom, having a molecular weight of at least 5,000, prepared by emulsion polymerization in the presence of an anionic catalyst;

(ii) an aqueous emulsion, also prepared by emulsion polymerization of a mixture of vinyl unsaturated monomers consisting of 1 to 7% by weight of an organosilicic monomer such as vinyltriethoxysilane and 93 to 99% by weight of an organic monomer such as styrene, methyl methacrylate, or vinyl chloride;

(iii) an aqueous emulsion of an organotin salt; and (iv) a silane containing hydrolyzable groups functioning as a cross-linking agent, such as methyltrimethoxysilane.

The '356 patent teaches that it is essential that the mixture of the three emulsions be neutral or slightly basic before the silane containing the hydrolyzable groups is introduced.

Thus, the state of this art is that it is indeed possible to provide anti-adhesive coatings of good quality on numerous substrates, and in particular on cellulosic materials, from compositions which are in the form of aqueous emulsions and which contain organopolysiloxane polymers and optionally organic polymers.

The state of this art, however, is conspicuously silent as regards any specific means necessary to prepare an aqueous emulsion composition, stable to storage and to shear, conjointly containing a diorganopolysiloxane terminated at each end of its polymer chain by a SiOH radical, an organohydropolysiloxane, and an organic polymer. Moreover, over the course of the application of an aqueous emulsion composition to the surface of a substrate to be treated, this art is also silent as regards:

(1) the means to be employed to restrict or even prevent the penetration of the aqueous emulsion composition into the bulk of porous materials such as cellulosic materials;

(2) the means to be employed to prevent excessively fast evaporation of the water in the emulsion (water removal which is badly controlled occasionally gives rise to the formation of heterogeneities in the anti-adhesive coating produced);

(3) the means to be employed to prepare aqueous emulsion compositions which make it possible to impart both water-repellent and anti-adhesive properties (directly on papermaking machines) to unbleached, coarsely beaten papers (such papers still contain not insignificant quantities of products which inhibit sensitive catalysts for hardening such as platinum derivatives); and (4) the means to be employed to obtain, from aqueous emulsion compositions, coatings which retain water-repellent and anti-adhesive properties at the same time, over a wide temperature region ranging, for example, from −100° C. to 300° C. Very low temperatures can be encountered in refrigeration equipment employed for deep-freezing foodstuffs, and very high temperatures in microwave ovens employed for fast cooking of foodstuffs. When the foodstuffs are wrapped in paper, it is essential that the latter not only withstands these rigorous treatments, but also, after the foodstuffs have returned to ambient temperature, has sufficient anti-adhesive characteristics to be removed from around the foodstuffs without tearing.

Hereinafter, all parts or percentages are by weight, unless otherwise indicated.

SUMMARY OF THE INVENTION

Accordingly, a major object of the present invention is the provision of improved aqueous emulsion coating compositions conspicuously devoid of those disadvantages and drawbacks to date characterizing the state of this art, and which are storage-stable and adopted to render a wide variety of substrates both anti-adhesive and water-repellent, notably cellulosic substrates such as paper.

Briefly, the subject compositions comprise:

(A) 100 parts of a diorganopolysiloxane oil having the formula:

in which each of the symbols R, which are identical or different, denotes an alkyl radical containing from 1 to 3 carbon atoms, the 3,3,3-trifluoropropyl radical, the vinyl radical, at least 50% of the radicals denoted by R are methyl radicals and at most 5% are vinyl radicals, the symbol n denotes any number, the value of which is such that the viscosity of the polymer is in the range of 500 to 50,000 mPa.s at 25° C.;

(B) 15 to 90 parts of a resin consisting of recurring units selected from among those of formulae $R'SiO_{1.5}$, $R'_2SiO$ and $R'_3SiO_{0.5}$, in which each of the symbols $R'$, which are identical or different, denotes an alkyl radical containing from 1 to 3 carbon atoms or the vinyl radical, with at least 70% of the radicals denoted by the symbols $R'$ are methyl radicals, and said recurring units are distributed such as to provide a ratio $R'/Si$ ranging from 1.05 to 1.85;

(C) 3 to 25 parts of a liquid organohydropolysiloxane containing at least 3 hydrogen atoms bonded to silicon atoms per molecule, the organic groups bonded to the silicon atoms being selected from among the radicals denoted by the symbol $R'$ as described under (B), at least 80% of which radicals are methyl radicals;

(D) 0.03 to 6 parts of a thickening agent selected from among the polysaccharides obtained by carbohydrate fermentation utilizing a microorganism of the genus Xanthomonas;

(E) 10 to 70 parts of a polyvinyl acetate homo- or copolymer;

(F) 2 to 20 parts of a polyvinyl alcohol;

(G) 0.1 to 10 parts of a non-ionic emulsifying agent selected from among the polyoxyethylenated alkylphenols; and (H) 60 to 800 parts of water.

DETAILED DESCRIPTION OF THE INVENTION

More particularly according to the present invention, the diorganopolysiloxane oil (A) having a viscosity of 500 to 50,000 mPa.s at 25° C., preferably 700 to 45,000 mPa.s at 25° C., is advantageously a straight-chain polymer consisting, as shown by the aforementioned formula $HO(SiR_2O)_nH$, of a series of diorganosiloxane recurring units of the formula $SiR_2O$; however, the presence of monoorganosiloxy units of the formula $RSiO_{1.5}$ and/or of siloxy units of the formula $SiO_2$ is not excluded in a proportion of at most 2% relative to the total number of diorganosiloxy units. The alkyl radicals containing from 1 to 3 carbon atoms, denoted by the symbols R, include methyl, ethyl and n-propyl radicals.

As specific examples of recurring units denoted by the formula $R_2SiO$, representative are those of the formulae:

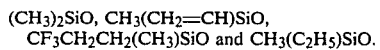

These units and those which are also intended by altering the definition of the symbol R, are not distributed at random; in fact, their distribution in the polymers (A) follows the requirements established earlier. Thus, at least 50%, preferably at least 60%, of the radicals denoted by R are methyl radicals, and at most 5%, preferably at most 4%, are vinyl radicals.

It will be appreciated, in one embodiment of the invention, that it is possible to use as polymers (A) a mixture of polymers which differ from each other in their average molecular weight and/or the nature of the groups bonded to the silicon atoms.

The polymers (A) are readily commercially available from silicone manufacturers; moreover, they can easily be prepared. One of the most widespread preparative methods consists, in a first step, in polymerizing diorganocyclopolysiloxanes in the presence of catalytic amounts of alkaline or acid agents and then treating the polymerizates with calculated amounts of water (French Pat. Nos. 1,134,005, 1,198,749 and 1,226,745); this addition of water, which is proportionately higher the lower the viscosity of the polymers to be prepared, can be entirely or partly replaced by diorganopolysiloxane oils blocked at each end of their polymer chain with a SiOH radical, of low viscosity, ranging, for example, from 5 to 200 mPa.s at 25° C., and containing a high proportion of hydroxy radicals, for example 3 to 14%.

Preferably, the polymers (A) are dimethylpolysiloxanes blocked at each end of their polymer chain with a SiOH radical, having a viscosity of 800 to 30,000 mPa.s at 25° C.

The resins (B) are characteristically employed in a proportion of 15 to 90 parts, preferably 17 to 85 parts, per 100 parts of the diorganopolysiloxanes (A). These are copolymers consisting of recurring units selected from among those of formulae $SiO_2$, $R'SiO_{1.5}$, $R'_2SiO$ and $R'_3SiO_{0.5}$, in which each of the symbols $R'$, which are identical or different, denotes a methyl, ethyl, n-propyl or vinyl radical, at least 70%, preferably at least 75%, of the radicals denoted by the symbol $R'$ are methyl radicals; moreover, these resins contain at least 0.2%, preferably at least 0.3%, by weight of hydroxy radicals directly bonded to silicon atoms. The distribution of the aforementioned recurring units is such that these resins (B) have a ratio $R'/Si$ ranging from 1.05 to 1.85, preferably ranging from 1.1 to 1.80.

The resins (B) are preferably liquid products having a viscosity which can range from 50 to 100,000 mPa.s at 25° C.; however, they can be introduced into the emulsion compositions of the invention in the form of solutions in the usual organic solvents for silicone resins.

These solvents are generally selected from among toluene, xylene, cyclohexane, methylcyclohexane, and n-butyl acetate. The weight concentration of resins (B) in these solutions can vary widely, for example, from 15 to 80%.

The preparation of these resins is also well known; it generally consists in co-hydrolyzing organochlorosilanes selected from among those of formulae $SiCl_4$, $R'SiCl_3$, $R'_2SiCl_2$ and $R'_3SiCl$, the co-hydrolysis taking place, or not, in the presence of water-immiscible solvents. However, the addition, at the beginning or during the hydrolysis, of small proportions of water-miscible diluents, such as ethanol, n-propanol, isopropanol or n-butanol (alone or in combination with acetone or 1,4-dioxane) is not excluded.

By following the methods above described, advantageously prepared are those 4 groups of resins (B) comprising the following recurring units:

(1) $R'SiO_{1.5}$ and $R'_2SiO$
(2) $R'SiO_{1.5}$ and $R'_3SiO_{0.5}$
(3) $R'SiO_{1.5}$, $R'_2SiO$ and $R'_3SiO_{0.5}$
(4) $SiO_2$, $R'SiO_{1.5}$, $R'_2SiO$ and $R'_3SiO_{0.5}$ In the last group (4) the units $SiO_2$ represent numerically at most 8% of the total of the 4 units $SiO_2$, $R'SiO_{1.5}$, $R'_2SiO$ and $R'_3SiO_{0.5}$. Preferably, liquid resins are used consisting of:

(i) units of formulae $CH_3SiO_{1.5}$ and $(CH_3)_2SiO$ which have a ratio $CH_3/Si$ ranging from 1.1 to 1.6, having a viscosity of from 1,000 to 30,000 mPa.s at 25° C. and containing from 0.8 to 3.5% of hydroxy radicals bonded to silicon atoms; and (ii) units of formulae $(CH_3)_3SiO_{0.5}$, $(CH_3)_2SiO$ and $CH_3SiO_{1.5}$ with a ratio $CH_3/Si$ ranging from 1.6 to 1.85, a viscosity of 50 to 800 mPa.s at 25° C. and containing from 0.3 to 3% of hydroxy radicals bonded to silicon atoms.

These resins are also readily commercially available from silicone manufacturers; they too can be easily prepared according to the co-hydrolysis methods which appear, more particularly, in French Pat. Nos. 1,226,745, 1,408,662, 2,429,811 and 2,521,574.

The organohydropolysiloxane (C) is employed in a proportion of 3 to 25 parts, preferably 3.5 to 22 parts per 100 parts of diorganopolysiloxanes (A); it must contain at least three SiH groups per molecule.

It corresponds more precisely to the average general formula:

in which the symbol R' denotes a methyl, ethyl, n-propyl or vinyl radical, at least 80%, preferably at least 85%, of the R' radicals are methyls.

The symbol x denotes any number ranging from 1 to 1.99, the symbol y denotes any number ranging from 0.1 to 1, the sum $x+y$ ranging from 1.7 to 2.6. Methylhydropolysiloxanes are preferably employed as organohydropolysiloxanes (C).

The organohydropolysiloxanes (C) are available on the silicone market, in addition to which the methods for preparing them are now well developed. One of the most widely used methods consists, in a first stage, in co-hydrolyzing suitable mixtures of chlorosilanes selected from among those of formulae $R'_3SiCl$, $R'_2SiCl_2$, $R'SiCl_3$, $SiCl_4$, $HR'_2SiCl$, $HR'SiCl_2$ and $HSiCl_3$. Suitable mixtures should be understood to indicate mixtures, each of which contains, per silicon atom, a number of radicals R' and a number of hydrogen atoms corresponding respectively to the values denoted by the symbols x and y in the average general formula, the sum of these numbers also having to correspond to the permitted values for the sum $x+y$.

In a second step, the co-hydrolyzates are brought to a temperature ranging from 80° to 220° C., preferably in the presence of acid agents such as sulfuric acid or acid-activated earths. Over the course of this heating a rearrangement of the siloxane bonds takes place, together with the condensation of the SiOH groups. These conversions give rise to organohydropolysiloxane polymers (C) which thus have, depending upon the original chlorosilane mixtures, straight-chain, ring or branched structures.

Among the straight-chain polymers, representative are, by way of illustration, those corresponding to the following formulae:

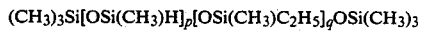

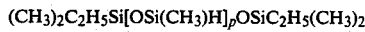

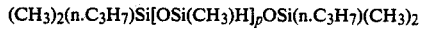

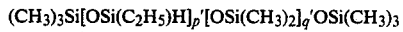

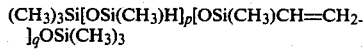

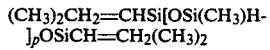

in which the symbol g denotes any number ranging from 3 to 120, h any number ranging from 1 to 50, p any number ranging from 6 to 60, p' any number ranging from 5 to 15, q any number ranging from 1 to 10 and q' any number ranging from 7 to 40.

In general these straight-chain polymers have a low viscosity; it ranges, for example, from 5 mPa.s to 500 mPa.s at 25° C.

Among the ring polymers, those having the following formulae are representative:

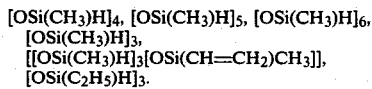

In the case of the branched polymers, each of these consists of a combination of recurring units selected from among those of the formulae $R'_3SiO_{0.5}$, $R'_2SiO$, $R'SiO_{1.5}$, $SiO_2$, $HR'_2SiO_{0.5}$, $HR'SiO$ and $HSiO_{1.5}$, each combination of which defines a polymer containing at least one unit selected from among those of formulae $R'SiO_{1.5}$, $SiO_2$, $HSiO_{1.5}$, the units being distributed, however, such that the average formula, reduced to one silicon, of each polymer is included in the above-mentioned average general formula.

The viscosity of these polymers advantageously ranges from 2 mPa.s at 25° C. to 10,000 mPa.s at 25° C.

As specific examples of low-viscosity branched polymers, the following are representative:

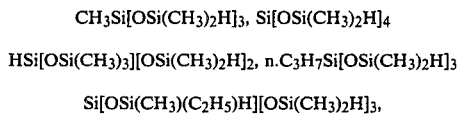

as well as those consisting of $SiO_2$ and $H(CH_3)_2SiO_{0.5}$ with a $CH_3/Si$ ratio of 1 to 1.5.

The thickening agent (D) is employed in a proportion of 0.03 to 6 parts, preferably 0.04 to 5.5 parts per 100 parts of the diorganopolysiloxanes (A). It is selected from the polysaccharides obtained by carbohydrate fermentation using a microorganism of the genus Xanthomonas.

These polysaccharides are straight-chain polymers of high molecular weight, generally over 1 million, originating from fermentation in an aqueous medium of materials selected, for example, from among glucose, sucrose, cellulose, fructose, maltose, lactose, soluble starch, potato starch, and maize starch.

Magnesium and phosphorus derivatives are added to the fermentation medium. A source of nitrogen must also be present in the medium, in the form of organic compounds (U.S. Pat. Nos. 3,000,790, 3,271,267 and 3,355,447 and French Pat. No. 2,414,555) or inorganic compounds (U.S. Pat. No. 3,391,060 and French Pat. No. 2,342,339).

Various species of the Xanthomonas genus may be employed for the production of these polysaccharides, such as *Xanthomonas begoniae, Xanthomonas incanae, Xanthomonas pisi* and more particularly *Xanthomonas campestris*.

The methods of manufacture of these polysaccharides have long been known. Those procedures featured in the immediately aforesaid patents (referred to as regards the use of a source of nitrogen) are fairly recent and consequently may be followed to advantage. In particular, the method described in French Pat. No. 2,415,555 makes it possible to produce polysaccharides which give readily filterable gels in aqueous solution.

The polyvinyl acetate (E) is employed in a proportion of 10 to 70 parts, preferably 12 to 65 parts, per 100 parts of the diorganopolysiloxanes (A). A polyvinyl acetate homopolymer or copolymer may be selected, the monomers to be copolymerized with vinyl acetate being vinyl esters of saturated, branched or unbranched monocarboxylic acids containing from 1 to 12 carbon atoms, such as vinyl propionate, "Versatate" (registered trademark for the esters of $C_9$-$C_{11}$ branched acids), pivalate, laurate and/or esters of unsaturated mono- or dicarboxylic acids containing 3 to 6 carbon atoms with alcohols containing 1 to 10 carbon atoms, such as methyl, ethyl, butyl or ethylhexyl acrylates, methacrylates, maleates or fumarates.

The comonomers are employed in quantities such that the glass transition temperature of the polymer obtained ranges from $-20°$ to $50°$ C. and preferably from $-10°$ to $35°$ C.

These homo- and copolymers are prepared by aqueous emulsion polymerization; they are very finely dispersed in the form of globules and their concentration in the aqueous emulsions is on the order of 30 to 65% by weight. These polyvinyl acetate latex emulsions usually produce, after deposition onto various solid substrates, film-forming coatings which have good aging resistance in air and high water vapor permeability.

The polyvinyl alcohol (F) is employed in a proportion of 2 to 20 parts, preferably 2.5 to 18 parts, per 100 parts of the diorganopolysiloxanes (A).

It is a powdery solid product which can still contain acetate groups; the percentage of hydrolysis is generally high, exceeding 85%.

The non-ionic emulsifying agent (G) is employed in a proportion of 0.1 to 10 parts, preferably 0.15 to 9 parts per 100 parts of the diorganopolysiloxanes (A). It is selected from among polyoxyethylenated alkylphenols; the alkyl radical, which may be straight-chain or branched, contains from 1 to 15 carbon atoms. As specific examples, the alkyl radical may be methyl, butyl, 2-ethylhexyl, n-octyl, nonyl, undecyl or dodecyl radicals.

The number of recurring units of the formula $CH_2CH_2O$ in the polyoxyethylene sequence has a great influence on the emulsifying properties of the polyoxyethylenated alkylphenols; it is preferably greater than 5 and smaller than 30. It is possible to employ a mixture consisting of several emulsifying agents (G) in which the emulsifying agents differ from each other only in the number of $CH_2CH_2O$ units.

Water (H) is employed in a proportion of 60 to 800 parts, preferably 70 to 750 parts per 100 parts of the diorganopolysiloxanes (A). It is thus possible to prepare aqueous emulsion compositions containing, for example, from 15 to 85% of solids, preferably 20 to 80%. It is not particularly desirable to prepare emulsions outside the above concentrations; in fact, when they are too dilute, their packaging and transport become more costly, and on the other hand, when they are too concentrated, this may in the long term give rise to a beginning of destruction of the emulsions through separation of one or more of their components.

The aqueous emulsion compositions of the invention may be obtained in a variety of techniques.

The present invention also features a preferred process for the preparation of the said compositions. This process is characterized in that it comprises:

(i) preparing an emulsion $S_1$ by charging a mixture through a colloid mill containing the diorganopolysiloxane oil (A), the organopolysiloxane resin (B), the thickening agent (D), the polyvinyl alcohol (F), a fraction of the non-ionic emulsifying agent (G) and the water (H);

(ii) preparing an emulsion $S_2$ by charging a mixture through a colloid mill containing the organohydropolysiloxane (C), the remaining fraction of the non-ionic emulsifying agent (G) and water (H);

(iii) intimately mixing emulsion $S_1$, emulsion $S_2$ and an aqueous emulsion of polyvinyl acetate (E).

The preparation of emulsions $S_1$ and $S_2$ does not present particular difficulties.

In particular, to prepare emulsion $S_1$, the various components (A), (B), (D), (F), (G) and water (H), may be added to a premixer, the order mentioned earlier being followed. It is also possible, in a first step, to dissolve the powdery solid materials including polyvinyl alcohol (F) and the thickening agent (D) in water and then, after a solution has been obtained, to add the diorganopolysiloxane oil (A), the resin (B) and the emulsifying agent (G). This mixture is emulsified and then diluted, if need be, with water to the desired concentration.

The fraction of emulsifying agent (G) employed to manufacture emulsion $S_1$ (expressed as a weight percentage of the total quantity of the emulsifying agent (G) introduced into the aqueous emulsion compositions according to the invention) represents a value ranging from 15 to 70%, preferably from 18 to 65%.

As regards the preparation of emulsion $S_2$, which contains only the organohydropolysiloxane (C) and the remaining portion of the emulsifying agent (G), (this portion represents 15 to 70% of the total quantity employed), as above indicated, these 2 components are introduced with water into a premixer and then the entire mass is emulsified and, if need be, diluted with water to the required concentration.

To obtain the aqueous emulsion compositions according to the invention it is thus sufficient to mix, by simple stirring, emulsion $S_1$, emulsion $S_2$ and the emulsion containing polyvinyl acetate (E).

The concentration of water in the aqueous emulsion compositions is, also as above indicated, fairly variable, depending upon the eventual application envisaged and on the constraints due, for example, to transport and storage methods.

The aqueous emulsion compositions are very stable in storage; as a result, no evolution of hydrogen takes place during their prolonged storage, in closed containers, at temperatures on the order of 40° C. and above. Furthermore, separation of their components, which is frequently seen as the presence of creamy agglomerates at their surface, does not take place.

The compositions are ultimately used to impart a water-repellent and/or anti-adhesive character to solid materials of all kinds, and more particularly to cellulosic materials such as paper and cardboard.

However, to employ these compositions, it is necessary to add to them a catalytically effective amount of a catalyst for the SiH/SiOH reaction, preferably in the form of an aqueous emulsion, a catalyst which is typically selected from among the organic tin derivatives.

The present invention, thus, also features a ready-to-use composition which can be employed for the anti-adhesive and/or water-repellent treatment of substrates, a composition consisting of an aqueous emulsion composition according to the invention and a catalytically effective amount of a catalyst for the SiH/SiOH reaction.

As such tin derivatives, representative are:

(1) Organotin salts of mono- or polycarboxylic acids such as dibutyltin or dioctyltin dilaurate, dibutyltin or dioctyltin di(2-ethylhexanoate), dibutyltin or dioctyltin diacetate, tributyltin 2-ethylhexanoate, tributyltin acetate, tributyltin laurate, dibutyltin succinate and dioctyltin maleate.

(2) The compounds of the formula $T_2Sn(SCH_2COOT)_2$ in which the symbols T, which are identical or different, denote alkyl radicals containing from 3 to 20 carbon atoms, such as propyl, butyl, hexyl, octyl, isoctyl, decyl, dodecyl and octadecyl radicals. By way of illustration, these compounds may correspond to the formulae:

(n$C_4H_9$)$_2$Sn(S$CH_2$COOiso—$C_8H_{17}$)$_2$ and

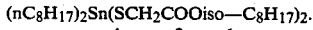
(n$C_8H_{17}$)$_2$Sn(S$CH_2$COOiso—$C_8H_{17}$)$_2$.

The preparation of such compounds appears, for example, in Canadian Pat. No. 846,201 and French Pat. Nos. 1,477,892 and 1,488,631.

(3) The polymers with —Ti—OSn— sequences prepared by the reaction of alkyl titanates (the alkyl radical containing from 3 to 10 carbon atoms) with organotin salts of mono- or polycarboxylic acids mentioned earlier. Such polymers appear in French Pat. No. 1,392,648 and British Pat. No. 928,496.

In order to add this catalyst to the aqueous emulsion compositions, it is recommended that it is dispersed in an aqueous emulsion beforehand. This result is readily obtained by employing the methods noted above for the preparation of the emulsions $S_1$ and $S_2$. Thus, polyvinyl alcohol, the tin salt selected and water may be mixed beforehand and then the mixture thus formed may be emulsified using a colloid mill. The millbase may be diluted with water to the required concentration such as to produce an emulsion containing, for example, from 8 to 70% of tin salt, preferably from 10 to 65%.

The tin salt emulsion is added to the aqueous emulsion compositions in a quantity which is sufficient to provide from 1.5 to 12 parts of tin salt, preferably from 2 to 10 parts, per 100 parts of the diorganopolysiloxanes (A); expressed as tin metal, this corresponds substantially to 0.10 to 2.5 parts, preferably 0.15 to 2.2 parts of tin per 100 parts of the diorganopolysiloxanes (A).

The catalyzed aqueous emulsion compositions are stable for at least 48 hours at ambient temperature; as a result, they may remain in the vats of the coating machines for at least 2 consecutive working days.

They can be applied by means of devices typically employed in industrial papercoating machines such as systems using air knives, an equalizing bar, and the like. Once deposited onto the substrates, the aqueous emulsion compositions are hardened in a few seconds by transferring same through tunnel ovens heated to about 80° C.–220° C.; the residence time in these ovens is generally between 3 and 20 seconds, and is a function, for a given length of ovens, of the speed at which the substrates travel.

At about 100°–130° C. from 10 to 20 seconds should be allowed to obtain a correctly applied coating. This period includes the proportion of time required to evaporate the water; this proportion is frequently more than $\frac{1}{2}$.

The quantities of compositions deposited onto the substrates can vary; they depend on the solids content of the compositions and on the water-repellent and anti-adhesive properties required; it is desirable that the quantities deposited provide from 0.3 to 1.2 g of solids per $m^2$ of the surface area to be treated.

The solids consist of the compounds introduced, namely, components (A), (B), (C), (D), (E), (F), (G) and the tin salt and/or the reaction products of these compounds; the weight percentage due to the organosilicic polymers (A), (B), (C) is on the order of 65 to 90% and that due to the polyvinyl acetate (E) is on the order of 8 to 25%.

The coatings obtained in this manner impart to the substrates on which they are applied very good anti-adhesive and water-repellent qualities which are maintained over time. These coatings have good friction resistance, and consequently are not removed by abrasion when their substrate sheets (or strips) pass over the return rolls of coating on adhesive-coating machines, rolls made of materials, the surfaces of which are more or less rough.

The aqueous emulsion compositions according to the invention can be applied onto all substrates which will subsequently be in contact, for example, with substances which are sticky and/or which release moisture.

These substrates may include various varieties of paper (such as kraft paper of any degree of beating whatever, glassine, sulfite papers) cardboards, vegetable parchment, papers coated with polyethylene or carboxymethylcellulose, regenerated cellulose sheets (such as cellophane) or cellulose polyacetate sheets, plastic sheets such as those made of polyethylene, polypropylene, polyethylene terephthalate, metal sheets, cloths based on synthetic fibers, glass fibers or asbestos fibers, and non-woven fibrous materials whether based on cellulose fibers or synthetic fibers or a mixture of these fibers.

The present invention thus also features a process for coating these substrates to render them anti-adhesive and/or water-repellent and the substrates, per se, coated in this manner.

The materials which are rendered anti-adhesive in this fashion are employed as interleaving, separating substrates, papers and films for transfer and wrapping of sticky substances such as confectionery, patisserie, raw rubbers, tars and bitumens, waxes or foodstuffs which release moisture, such as fish, meat or cheese.

In particular, the coated papers can be used for packaging deep-frozen foodstuffs; the foodstuffs do not adhere to their packaging even after a storage period of a year or more at temperatures which can be as low as $-70°$ C. In addition, these packages can withstand, without disintegrating, the stresses of fast-cooking methods for deep-frozen foodstuffs (temperature on the order of 300° C. in microwave ovens, steam-cooking); these methods are employed, for example, in quick-service restaurants in supermarkets.

Obviously, all of these qualities are a consequence of the selection of the various components present in the aqueous emulsion compositions of the invention; they are also a consequence of the process for the preparation of these compositions. More precisely:

(i) the group consisting of diorganopolysiloxane oils (A), the organopolysiloxane resin (B), and the organohydropolysiloxane (C), contributes the water-repellent and anti-adhesive nature which is required;

(ii) the thickening agent (D), on the one hand, provides the aqueous emulsion compositions with a pseudoplastic state which prevents them from penetrating too far into the substrates, and chiefly into those which are porous and, on the other hand, enables these compositions to have a suitable water retention during the formation of the coatings, resulting in the production of homogeneous, perfectly cross-linked coatings;

(iii) the polyvinyl acetate (E) further reinforces the water-repellent nature of the coatings.

In order to further illustrate the present invention and the advantages thereof, the following specific example is given, it being understood that same is intended only as illustrative and in nowise limitative.

EXAMPLE (a) The following components were intimately admixed:

(i) 100 parts of a methylhydropolysiloxane blocked at each end of its polymer chain with a trimethylsiloxyl unit, and having a viscosity of 40 mPa.s at 25° C.;

(ii) 8 parts of a 70/30 weight mixture of two polyoxyethylenated nonylphenols, one having 10 OCH$_2$CH$_2$ units and the other 20 OCH$_2$CH$_2$ units;

(iii) 15.4 parts of water;

(iv) 0.5 part of a 40% strength aqueous solution of acetic acid.

This mixture was emulsified by passing same through a colloid mill. The millbase was diluted by adding 43 parts of water; the emulsion obtained contained 60% of methylhydropolysiloxane.

(b) The following components were intimately admixed:

(i) 231 parts of water;

(ii) 20 parts of a polyvinyl alcohol with a saponification value of 140 and a viscosity of 25 mPa.s at 25° C. measured as a 4% solution in water;

(iii) 0.5 part of a white, food-grade powder marketed under the trademark Rhodigel 23; this was a polysaccharide produced by the fermentation of carbohydrates using *Xanthomonas campestris*. The process for preparing this polysaccharide appears in French Pat. No. 2,414,555.

To this mixture were then added:

(iv) 1.5 parts of the 70/30 weight mixture of the 2 polyoxyethylenated nonylphenols employed under (a);

(v) 120 parts of a liquid resin consisting of CH$_3$SiO$_{1.5}$ and (CH$_3$)$_2$SiO units distributed such as to provide a CH$_3$/Si ratio of 1.3, with a hydroxyl content of 1.8%, and a viscosity of 10,000 mPa.s at 25° C.;

(vi) 250 parts of a dimethylpolysiloxane oil blocked at each end of its polymer chain with a hydroxy radical, and having a viscosity of 5,000 mPa.s at 25° C.

The entire mass was finely emulsified by passing same through a colloid mill. The millbase was diluted by adding 156 parts of water and the following materials were incorporated in the diluted millbase by simple stirring:

(1) 150 parts of an aqueous emulsion containing 50% by weight of polyvinyl acetate, an emulsion marketed under the trademark RHODOPAS A 206, with a Brookfield viscosity, at 50 revolutions/minute, of less than 150 mPa.s at 25° C. (glass transition temperature: 35° C.);

(2) 50 parts of the emulsion prepared under (a);

(3) 20 parts of monopropylene glycol.

The aqueous emulsion composition thus formed was very stable in storage. In particular, after being maintained in a closed container for 6 months at 40° C., it showed no significant loss of SiH groups.

(c) The following components were intimately admixed:

(i) 38 parts of di(n-octyl)tin dilaurate;

(ii) 2 parts of the polyvinyl alcohol employed under (b);

(iii) 0.1 part of acetic acid;

(iv) 5 parts of water.

The entire mass was finely emulsified by passing same through a colloid mill. The millbase was diluted by adding 52 parts of water. 3 parts of monopropylene glycol were then added by simple stirring.

A catalyzing emulsion was obtained in this manner.

(d) 4 parts of the catalyzing emulsion prepared under (c) were added to 100 parts of the emulsion composition prepared under (b).

This catalyzed emulsion was then diluted by adding a sufficient quantity of water to form a process bath containing 10% solids.

This bath was deposited at a rate of 8 g/m$^2$ onto a kraft paper weighing 50 g/m$^2$, smooth-surfaced.

The application was carried out using a Mayer equalizing bar fitted to an industrial papercoating machine.

The emulsion film coating the paper was simultaneously dried and hardened by passing it for 15 seconds in a heated tunnel oven, the temperature in the region of the paper being 110° C.

In this manner a coated paper was obtained, one face surface of which had approximately 0.8 g/m² of a perfectly crosslinked thin coating.

(e) Freshly caught fish was wrapped in paper treated according to (d), the coated face surface being the inner face of the package, and the entirety was placed in a deep-freeze unit cooled at −70° C.

After one month's storage in the deep-freeze unit, it was found that the deep-frozen fish was readily separated from its packaging.

This frozen fish was placed, together with its packaging, in a microwave oven and subjected to a temperature of 300° C. for several seconds. It was found that the paper withstood this treatment and, moreover, separated readily from the cooked flesh of the fish.

(f) An adhesive strip of the adhesive plaster type was applied to the coated face surface of the paper treated in accordance with (d), and this application was maintained for 24 hours under a pressure of 70 g/cm²; the force required to peel this strip was then measured with a dynamometer, the rate of peeling being 25 cm/minute. A peeling force of 5 g was found for a strip width of 1 cm. When an ultra-fast peeling speed of 300 m/min was employed, a peel force of 30 g was found for a strip width of 1 cm.

While this invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A storage-stable, aqueous emulsion composition of matter comprising an anti-adhesive/water-repellency effective amount of (A) a diorganopolysiloxane oil having the formula:

$$HO(SiR_2O)_nH$$

wherein the symbols R, which may be identical or different, are each an alkyl radical containing from 1 to 3 carbon atoms, the 3,3,3-tri-fluoropropyl radical, or the vinyl radical, at least 50% of the radicals R being methyl radicals and at most 5% vinyl radicals, and the symbol n is any number, the value of which is such that the viscosity of the oil ranges from 500 to 50,000 mPa.s at 25° C.; (B) an organopolysiloxane resin comprising a copolymer having recurring units selected from among those of the formulae $SiO_2$ $R'SiO_{1.5}$, $R'_2SiO$ and $R'_3SiO_{0.5}$, in which the symbols R' which may be identical or different, are each an alkyl radical containing from 1 to 3 carbon atoms, or the vinyl radical, at least 70% of the radicals R' being methyl radicals, and said units being distributed such as to provide a R'/Si ratio ranging from 1.05 to 1.85; (C) a liquid organohydropolysiloxane containing at least 3 hydrogen atoms per molecule directly bonded to silicon atoms, said organic groups bonded to the silicon atoms being R' radicals as defined above, at least 80% of said radicals being methyl radicals; (D) a thickening amount of a thickening agent; (E) a water-repellency effective amount of a vinyl acetate homoor copolymer; (F) a polyvinyl alcohol; (G) an emulsifying amount of a non-ionic emulsifier; and (H) water.

2. The composition of matter as defined by claim 1, comprising 100 parts of said diorganopolysiloxane oil (A), from 15 to 90 parts of said organopolysiloxane resin (B), said resin (B) comprising at least 0.2% by weight of hydroxyl radicals directly bonded to silicon atoms, from 3 to 25 parts of said liquid organohydropolysiloxane (C), from 0.03 to 6 parts of a xanthomonas polysaccharide (D), from 10 to 70 parts of said polyvinyl acetate (E), from 2 to 20 parts of said polyvinyl alcohol (F), from 0.1 to 10 parts of a polyoxyethylenated alkylphenol non-ionic emulsifier (G), and from 60 to 800 parts of water (H).

3. The composition of matter as defined by claim 1, further comprising a catalytically effective amount of a hardening catalyst.

4. The composition of matter as defined by claim 3, said hardening catalyst comprising a compound of tin.

5. The composition of matter as defined by claim 1, wherein said diorganopolysiloxane oil (A) has a viscosity ranging from 700 to 45,000 mPa.s at 25° C.

6. The composition of matter as defined by claim 5, said diorganopolysiloxane oil (A) comprising an SiOH end-blocked dimethylpolysiloxane having a viscosity of 800 to 30,000 mPa.s at 25° C.

7. The composition of matter as defined by claim 2, wherein said polyvinyl acetate (E) has a glass transition temperature ranging from −20° to 50° C.

8. A process for the preparation of the composition of matter as defined by claim 1, comprising separately emulsifying the components (A), (B), (D), (F), and a fraction of (G) in water; separately emulsifying the components (C) and the remaining fraction of (G) in water; and intimately admixing the resulting emulsions with an aqueous emulsion of said component (E).

9. A substrate coated with the composition of matter as defined by claim 1.

10. The coated substrate as defined by claim 9, said composition being in hardened state.

11. The coated substrate as defined by claim 10, comprising from 0.3 to 1.2 g of coating composition solids per m².

12. A storage-stable sealed container containing the composition of matter as defined by claim 1.

13. The coated substrate as defined by claim 10, comprising a cellulosic substrate.

* * * * *